Oct. 24, 1967   A. F. A. BARTELS ETAL   3,348,260
METHOD AND APPARATUS FOR THE FULLY AUTOMATIC FEED
OF FISH TO FISH WORKING MACHINES
Filed Nov. 18, 1964                                3 Sheets-Sheet 1

INVENTORS
A.F.A.Bartels and H.Kröger
BY
Richards y Geier
ATTORNEYS

Oct. 24, 1967 A. F. A. BARTELS ETAL 3,348,260
METHOD AND APPARATUS FOR THE FULLY AUTOMATIC FEED
OF FISH TO FISH WORKING MACHINES
Filed Nov. 18, 1964 3 Sheets-Sheet 2

INVENTORS
A.F.A. Bartels and H. Kröger
BY
Richards & Geier
ATTORNEYS

3,348,260
METHOD AND APPARATUS FOR THE FULLY AUTOMATIC FEED OF FISH TO FISH WORKING MACHINES
Alfred Friedrich Adolf Bartels, Lubeck-Israelsdorf, and Herbert Kröger, Lubeck, Germany, assignors to Nordischer Maschinenbau Rud. Baader, Lubeck, Germany, a firm
Filed Nov. 18, 1964, Ser. No. 412,193
Claims priority, application Germany, Nov. 19, 1963, N 24,039; Mar. 5, 1964, N 24,561; Sept. 10, 1964, N 25,495
8 Claims. (Cl. 17—2)

ABSTRACT OF THE DISCLOSURE

Small fish are fed automatically from a storage bin by a pick-up belt over rollers having guide plates which provide the uniform orientation of the fish head foremost. Then the fish move on their sides through three sets of channels, the first two of which oscillate, while the last two are provided with slots through which move spikes of timing wheels engaging the heads of the fish. Then the fish are placed on their bellies and moved into the feeding trough of another machine.

---

Figure 1:
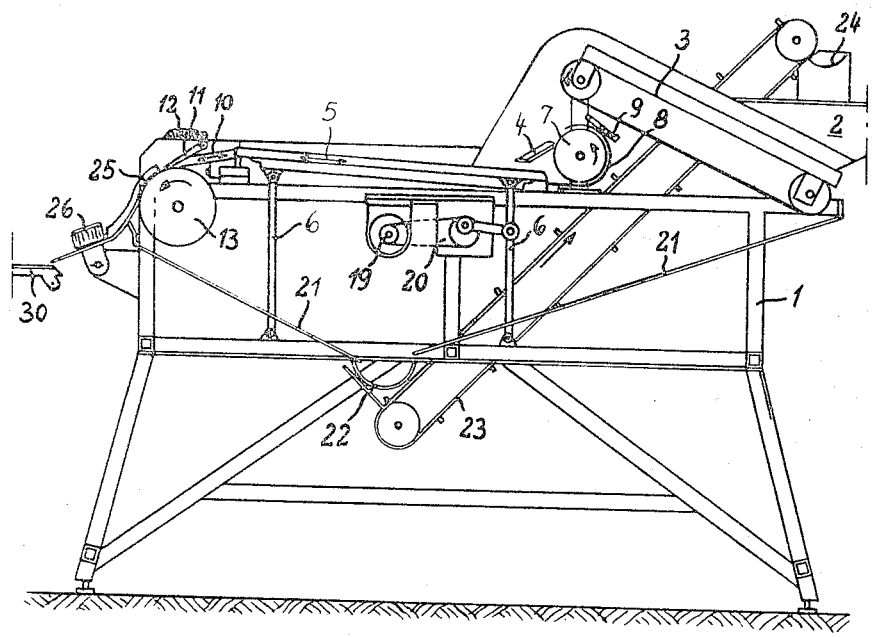

The invention relates to a method for the fully automatic feed of fish, particularly smaller shoal fish such as herrings or the like, to fish working or dressing machines, individually, in like oriented position, in rhythm and at a high speed.

Apparatus of this kind are known which operate according to various methods but no method has hitherto been found which meets all the conditions enumerated above in a satisfactory manner. It has been suggested to take the fishes individually from a storage bin with the aid of a spiked band and to orient the fish by means of an inclined chute so that, after separating those tail foremost, only those sliding head foremost in a V-shaped trough are stood on their backs. This method has not proved satisfactory because wrongly positioned fish are damaged by the spiked band, the fishes cannot be reliably stood on their backs and continuous operation in uniform rhythm is not possible.

According to another suggestion, the fishes are fed to a horizontal oscillating lay-out surface divided by partitions arranged above it and passing over at one end into an inclined surface while at the other end it feeds the fishes reoriented onto a surface thereunder, the channels of which lead between the channels of the inclined surface and merge therewith into V-shaped troughs for standing the fishes on their backs and terminate in oval tubular magazines for collecting those fishes which have not been slipped one on the other and are provided at their ends with leaf springs holding back the fishes. This arrangement did not prove successful for feeding fish working machines. In particular bringing the fishes into dorsal position, that is standing them on their backs, is very uncertain and the storing or collecting in the oval magazines is unreliable so that a continuous flow of like-oriented fishes cannot be achieved.

The object of the invention is to devise a method of feeding fish working machines by which the individual fishes are fed automatically in the same oriented position, in rhythm and at a high speed. In particular the orientation of the fishes according to head-tail and belly-back must be accurate and the singling and rhythm exact.

This object is achieved according to the invention in that the fishes are introduced into oscillating separate channels, those wrongly oriented are turned and returned in the proper position into the separate oscillating channels at the feed or inlet end thereof, are delivered singly to a righting device by the head in rhythm from below and transported on one side and stood on their bellies by this device. In this manner it is possible to feed particularly smaller shoal fishes to the fish working machines perfectly oriented as regards the head-tail position as well as the belly-back position, in predetermined rhythm and individually at a high speed, so that the fish-working machines with large outputs can also be properly supplied with the necessary material. This is rendered possible particularly by the fact that the turned fishes are returned directly to the intake end of the oscillating individual channels and the imparting of the rhythm and singling takes place between the orientation according to head-tail and the righting device for standing the fishes on their bellies.

The automatic feeding device for carrying out the method according to the invention consists of an oscillating device divided into parallel separate channels adapted to the shape of the fishes and provided with roughened surfaces, which device has at its intake end turning cylinders surrounded by guides, as well as a rhythmic timing device comprising spring-loaded catch flaps with spine wheels thereunder engaging through the surface supporting the fishes and a righting device composed of toothed cylinders rotating just above the bottom of the guide channels and guide surfaces producing therewith a passage of a certain size.

The channels for the righting device are preferably so arranged that they ascend from the intake end at an angle of at least 3 degrees. As a result, the separation of the wrongly oriented fishes is accelerated and any ice which may have been entrained is thrown out. To enable the turning to be better adapted to the different fish dimensions, the guide surfaces surrounding the turning cylinders are preferably arranged so that they yield resiliently.

If it is not desired to entrust the conveyance of the turned fishes to the orienting device itself, special separate channels can be provided above the channels of the orienting device for conveying the turned fish to the delivery end. As already mentioned, the channels are of a shape adapted to that of the fishes, that is are not of rectangular cross-section. They may be of trapezoidal, semicircular or compound curved cross-section.

As the rhythmic timing and singling device determines to a great extent the velocity of feed to the fish working machine, it must be ensured that a supply of fishes is always delivered from the orienting device and that only one fish is always passed on to the righting device in the desired rhythm. The first requirement can be better met by imparting an oscillating movement to the guide channels of the rhythmic timing and singling device. The individual pick-up is improved by constructing the guide channels as magazines storing the fishes laterally. The storage in scale fashion ensures that always only the foremost fish can be gripped by the head from underneath. The lateral scale-like storage is best achieved by the fact that the guide channel of a rhythmic timing device consists of a flat surface with guide edge extending at an incline to the direction of travel of the fish and a shallow trough slit at its end which is displaced in relation to the path of the fish and has a lateral guide edge.

The righting device has a resiliently yielding guide surface for easier adaptation to the different fish sizes within a certain range. This guide surface also has behind the toothed cylinder a part deflected to one side to guide each fish into the same lateral position. Furthermore, it is also preferable to provide for this purpose a rigid guide rail behind the toothed cylinder.

Figure 2:
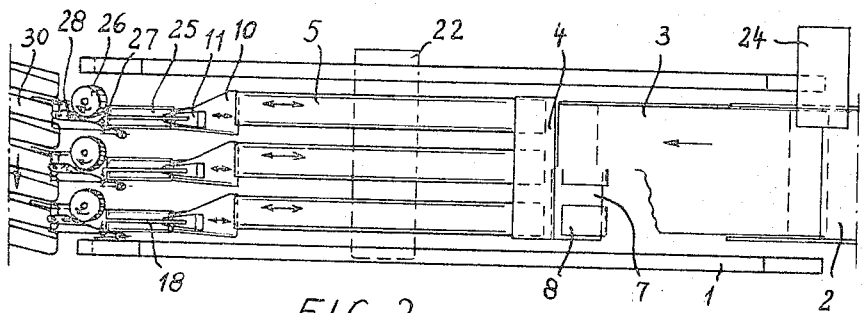
Figure 1A:
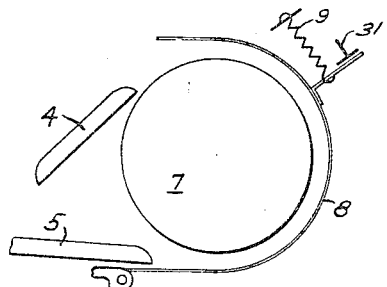
Figure 3:
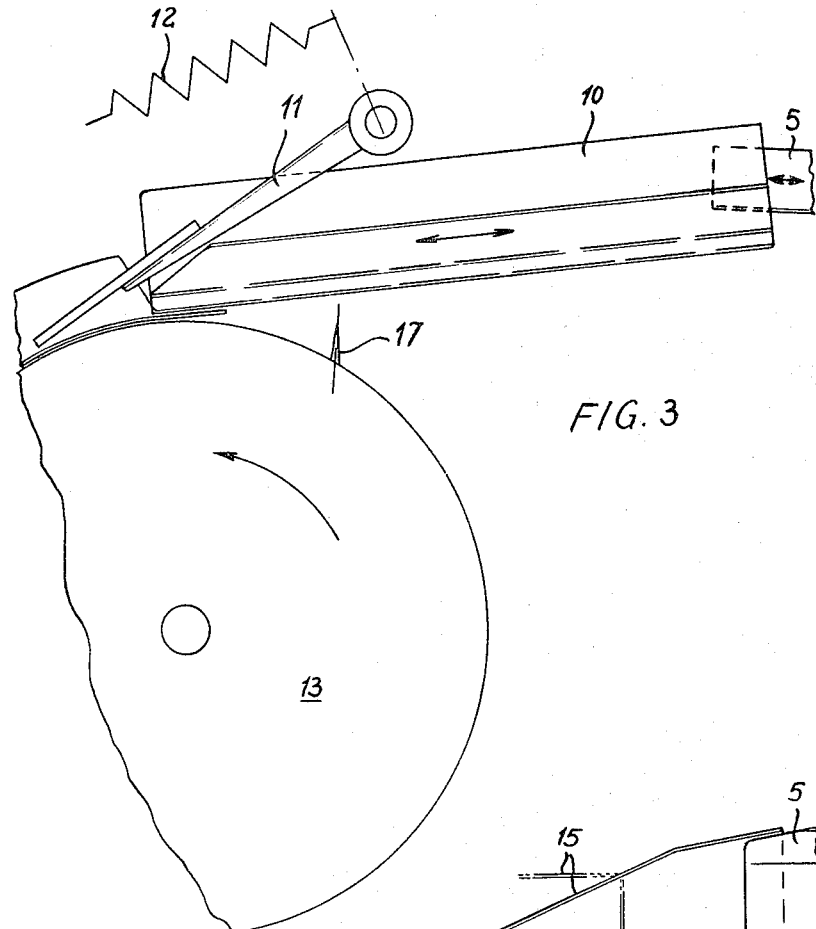
Figure 4:
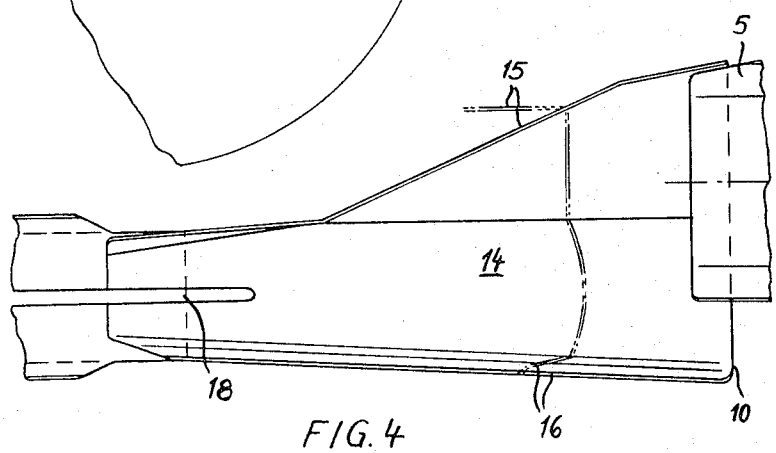
Figure 5:
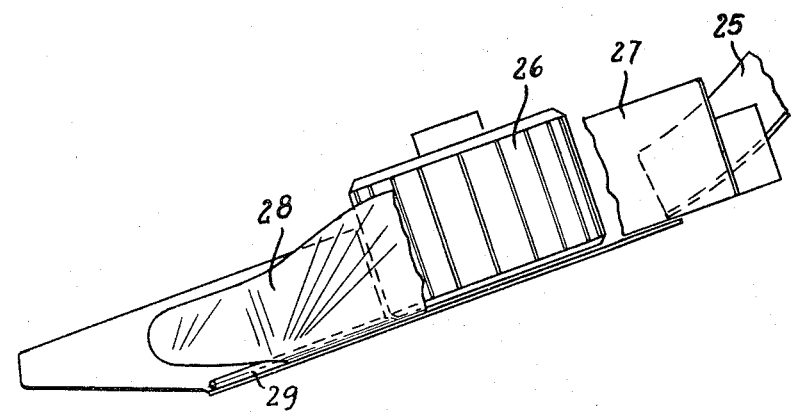
Figure 5:
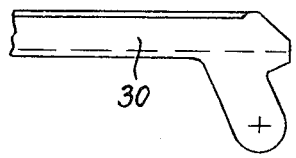

An embodiment of the automatic feeding apparatus operating according to the method of the invention is illustrated diagrammatically by way of example in the accompanying drawings, in which FIG. 1 is an elevation of the automatic feeding apparatus;

FIG. 1a is a side view of a detail on an enlarged scale;

FIG. 2 a top plan view thereof;

FIG. 3 a side elevation of the rhythmic timing device on a larger scale;

FIG. 4 a top plan view thereof;

FIG. 5 a side elevation of the uprighting device on a larger scale, and

Figure 6:
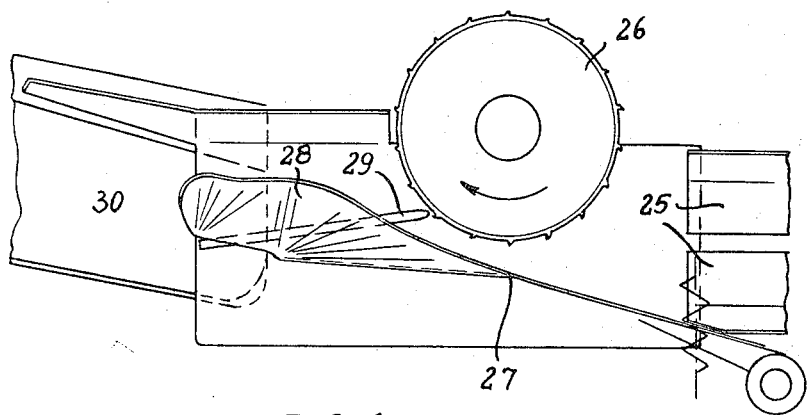

FIG. 6 a top plan view thereof.

The frame 1 carries a storage bin 2 for washed fish, the bottom of which forms an ascending conveyor belt 3. The orienting section is carried by links 6 and consists of oscillating guide channels 5. These are of any required cross section which is not rectangular, however. They ascend from the intake end at an angle of at least 3° to separate out any ice, wood or the like entrained by the fishes. At the intake end of each channel 5 a rotating turning cylinder 7 is arranged to which a guide plate 8 is coordinated which carries a spring 9 and an adjustable stop. As best shown in FIG. 1a, the guide plate 8 encloses a portion of the cylinder 7. The spring 9 tends to press the plate 8 toward the cylinder 7 while the stop 31 provides a limit for the maximum deflection of the plate 8. In use, properly directed fishes, namely, fishes the heads of which are directed forwardly, slide down the chutes 4 upon the oscillating channels 5 and move forwardly thereon. However, a fish which lands upon the oscillating channels 5 with its tail forward will be moved backwardly by the oscillation of the channels 5 until it is contacted by the cylinder 7. The cylinder 7 rotates in the direction of the arrow shown in FIG. 1 and it will take the fish along with it so that the fish will be moved between the cylinder 7 and the plate 8 and will reach the chute 4 head foremost. The purpose of the spring 9 connected to the plate 8, is to make it possible for the plate 8 to move somewhat away from the cylinder 7 when fish bodies of larger width are being moved between the plate 8 and the cylinder 7. After a fish has moved past the plate 8, the spring 9 returns the plate 8 to its initial position. The stop 31 prevents an inward swinging of the plate 8, namely its engagement with the roller 7. The stop 31 may be made adjustable so as to adapt the device to fishes of different sizes. The rhythmic timing devices follow the orientation section and are composed of guide channels 10, catch flaps 11 loaded by springs 12 and rhythm wheels 13 provided with spikes 17.

The guide channels 10 are preferably constructed as magazines for storing the fish laterally in scale fashion. The term "scale fashion" is used to indicate that the fish lie side by side and slightly over each other in a manner similar to that of the arrangement of scales in a fish. As indicated in FIG. 4, each channel consists of a flat surface with guide edge 15 extending obliquely to the direction of travel of the fish and a channel shaped part 14 with guide edge 16. The spikes 17 of the rhythmic timing wheels 13 engage the head of the fish through slots 18 provided in the bottoms 14 of the guide channels 10 and in the guide channels 25. The third set of guide channels 25 conform to the timing wheels 13 and lead into the devices for bringing the fishes into upright position resting on their bellies. One of the guide edges of each of these channels 25 leads to a rotating toothed wheel 26 while the other edge terminates in front of a yieldable, spring-loaded guide surface 27 whose position is adjustable in relation to the toothed wheel or cylinder. The portions 28 of the guide surfaces located behind the toothed cylinders 26 are preferably bent at an angle in order in cooperation with a guide rail 29 fixed on the base to effect uniform guiding of the fishes.

The driving mechanisms for the conveyor belts and cylinders are not shown in the drawings, whereas a driving motor is designated by 19 and an oscillating gear by 20. Superfluous fishes and water are collected in channels 22 through the intermediary of a funnel 21 and the fishes returned into the storage bin 2 with the aid of a conveyor belt 23 and a chute 24. The apparatus according to the invention operates in the following manner:

The washed fishes are stored in the storage bin 2 and removed therefrom by the pick-up belt 3 in the form of a thin layer. The fishes pass over chutes 4 into the separate oscillating channels 5 of the orienting section and are conveyed therein head foremost. Fishes resting with the head towards the intake end pass head first under the turning cylinder 7 and are returned into the separate oscillating channels 5 in the proper position over the chute 4. Owing to the fact that the channels 5 are not of rectangular cross-section the fishes arrange themselves in these channels in bands of fishes one behind the other which in passing through the guide channels 10 of the rhythmic timing device collect therein piled up laterally in scale fashion. Superfluous fishes drop over the lateral guide edges 15 into the funnel 21, are collected in the channels 22 and are returned in to the storage bin 2 by the conveyor belt 23 and the chute 24. The foremost of the fishes thus collected lies with its head under the catch flap 11, is gripped on the underside of the head by a spike rising through the slot 18 and drawn thereby in rhythm under the yielding catch flap 11 and passed down into the guide channel 25. On reaching the end of this channel, which is only short, the fish passes with the roof of its skull and the lower edge of its gill flaps between the guide surface 27 and the toothed cylinder 26 and raised on the rear side, that is placed on its belly. After leaving the toothed cylinders 26 the fishes while standing on their bellies can run directly into the intake zone of a fish working machine. Thus in accordance with the described apparatus fishes are moved lying on their sides until they reach the devices 26, 27, 28 and 29 which place them upon their bellies. In this position they can be effectively subjected to further treatment. There are certain machines, however, which require that the fishes be located upon one side. In that case it is necessary to bring them again into a position resting on one side by means of bent guide surfaces 28 and guide rails 29 and to push them in this position in which they lie on their sides into feeding trough 30 of a head-removing machine. The accurate rhythmic timing and reliable uprighting ensure smooth operation.

The invention is explained with the aid of the apparatus described but is not restricted thereto.

What we claim is:

1. A method of automatically transporting fish, particularly small fish, such as herrings, to a fish treating machine, said method comprising arranging the fish in the same direction with the head of each fish extending beyond the other fish while rearranging improperly directed fishes, moving them head forward and simultaneously rhythmically oscillating them, then arranging the fish partly over each other and then placing the fish upon their bellies while continuing to move them head forward to the fish treating machine.

2. An apparatus for automatically transporting fish, particularly small fish, such as herrings, to a fish treating machine, said apparatus comprising, in combination, oscillating channels having intake ends and outlet ends, separate means feeding the fish to said intake ends and turning the wrongly directed fish, said means comprising turning cylinders located adjacent said intake ends, and guide plates extending over a portion of the circumference of said cylinders; a rhythmic timing and orienting device having channels constituting a continuation of the first-mentioned channels and an uprighting device having channels constituting a continuation of the second-mentioned channels; and rotary toothed cylinders partially extending into the third-mentioned channels perpendicularly to the bottoms thereof, one of the walls of each of the third-mentioned channels constituting a yieldable guiding surface for the fish.

3. An apparatus in accordance with claim 2, wherein the timing device comprises means oscillating the second-mentioned channels, each of the second-mentioned channels having a bottom and two guide edges, one of said guide edges having a portion extending obliquely to the direction of the channel, the bottom of each of the second-mentioned channels having a portion provided with a longitudinal slot.

4. Apparatus according to claim 2, wherein the channels of the orienting device ascend from the intake end thereof at an angle of at least three degrees.

5. Apparatus according to claim 2, wherein the guide plates extending round the turning cylinders are yieldably resilient.

6. Apparatus according to claim 2, wherein the channels of the orienting device have a cross-section deviating from the rectangular shape.

7. Apparatus according to claim 2, wherein the uprighting device has a guide edge having a part bent to one side behind the toothed cylinders.

8. Apparatus according to claim 7, wherein a rigid guide rail is coordinated to each of the toothed cylinders on the rear side thereof.

References Cited

UNITED STATES PATENTS

| | | | |
|---|---|---|---|
| 1,893,903 | 1/1933 | Mullins | 17—2 |
| 3,229,326 | 1/1966 | Eriksen | 17—2 |
| 3,232,412 | 2/1966 | Bloss | 17—2 X |

FOREIGN PATENTS

| | | |
|---|---|---|
| 27,480 | 12/1916 | Norway. |
| 34,315 | 3/1922 | Norway. |

LUCIE H. LAUDENSLAGER, *Primary Examiner.*